S. D. HARTOG.
PISTON RING.
APPLICATION FILED MAY 3, 1915.
1,179,097.
Patented Apr. 11, 1916.
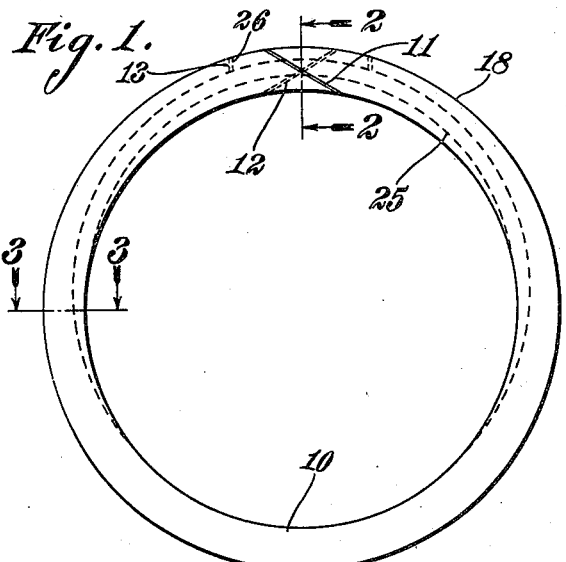
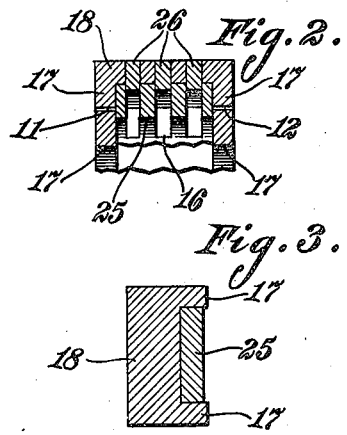
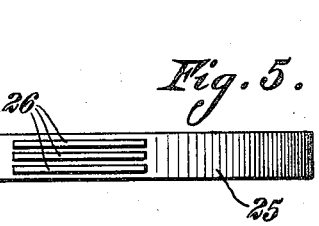
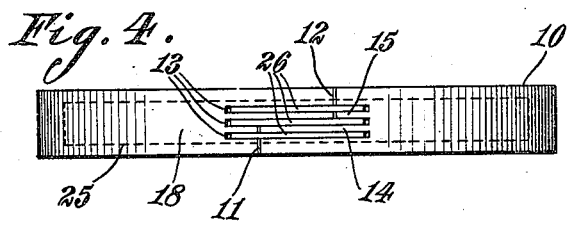
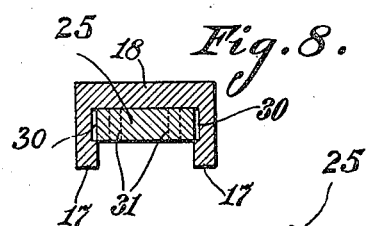
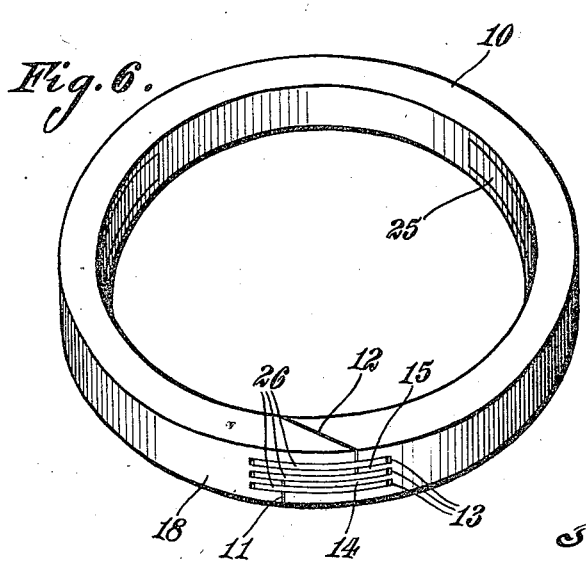
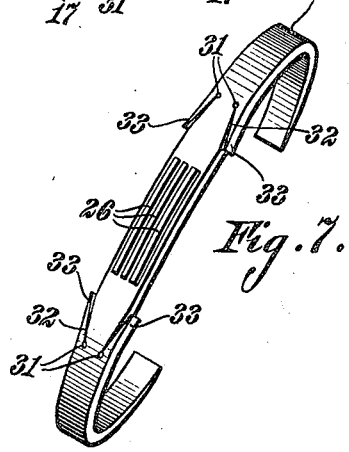
Inventor:
STEPHEN D. HARTOG,
By John N. Bruninga
His Attorney.

UNITED STATES PATENT OFFICE.

STEPHEN D. HARTOG, OF ST. LOUIS, MISSOURI.

PISTON-RING.

1,179,097.  Specification of Letters Patent.  Patented Apr. 11, 1916.

Application filed May 3, 1915. Serial No. 25,487.

*To all whom it may concern:*

Be it known that I, STEPHEN D. HARTOG, a citizen of the United States, and residing at St. Louis, in the State of Missouri, have invented a certain new and useful Improvement in Piston-Rings, of which the following is a specification.

This invention relates to piston rings or packings.

Piston rings must be split so that they can be sprung over the piston and placed in the grooves therein. This leaves an open space or split which is a source of leakage. Various means have been proposed to eliminate this leakage but without success. A piston ring must have a varying cross section increasing from the center to the ends of the ring, in order that the tension on the cylinder wall may be uniform. In piston rings as heretofore constructed the ring was, therefore, thinnest at the joint, and, moreover, these thin ends were often thinned down to form a lap joint. While this gave fairly good results when the piston ring was new and first placed in position, the wear of the thin part on the cylinder, and the entering of carbon between the ring and piston increasing the wear, in a short time thinned down this already thin part to such an extent as to render the ring useless as a packing. One of the main defects in the prior ring was on account of the lack of bearing wall at the thin part of the ring. Another inherent defect in rings is due to the fact that the increase in temperature, more especially in hydrocarbon engines, causes the iron to soften and lose its resiliency, whereby the ring does not bear yieldingly against the cylinder walls as it should in order to make a gas tight joint.

One of the objects of this invention, therefore, is to provide a piston ring which will have maximum bearing walls with maximum strength and wearing qualities, and which will, moreover, have a uniform and constant tension.

Another object is to provide a piston ring which is so constructed that the tension of the ring and the pressure on the cylinder walls will increase rather than decrease with the rise in temperature, and which has means for closing the joint in the ring to provide a leak proof joint, but without weakening the ring.

Further objects will appear from the detail description taken in connection with the accompanying drawing, in which:

Figure 1 is a side elevation of a ring embodying this invention; Fig. 2 is a section on the line 2—2, Fig. 1; Fig. 3 is a section on the line 3—3, Fig. 1; Fig. 4 is a plan of Fig. 1; Fig. 5 is a detail of the tension and joint closing member; Fig. 6 is a perspective view of the ring; Fig. 7 is a perspective view, showing another form of joint closing member, and, Fig. 8 is a section similar to that shown in Fig. 2, but showing another embodiment of this invention.

Referring to the accompanying drawing, 10 designates a ring, which is preferably formed of cast iron. This ring is of uniform width and thickness, and is split as shown at 11 and 12, these splits being formed by diagonal cuts each cutting half way through the rim. The ring, at its split end, is slotted, as shown at 13, thereby forming tongues 14 and 15, and it will be noted that the cut 11 extends through the tongue 14, while the cut 12 extends through the tongue 15. The ring is channeled circumferentially, as shown at 16, to form side flanges 17, but this channel is cut eccentric with respect to the ring, so as to increase in depth from the center to the ends of the ring. This will leave a web 18 which decreases in depth from the center to the ends of the ring.

The channel 16 is adapted to receive a tensioning and joint closing member comprising a strip 25, the ends of which decrease in thickness so as to conform to the inside of the channel 16. This strip has formed thereon fins or ribs 26 adapted to enter the slots 13, these fins or ribs being slightly shorter than the slots so as to allow the ends of the ring to come together. The strip 25 is preferably formed of a material having a greater coefficient of expansion than that of the cast iron ring 10, such metal being preferably spring bronze. The fins or ribs 26 are preferably formed by punching, the punch being so set as to stop before it goes through the material. When this strip is placed in position in the channel of the ring 10, with the fins engaging the slots in the ends of the ring, and the ring is slipped over the piston, the strip is retained in position on the piston by the engagement of the ends of the strip with the piston.

In order to provide additional means for positively retaining the strip or tensioning member 20 in the ring, the ring, Fig. 8, may have a counterbore or channel 30 therein. The strip 25 is then apertured as shown at 31 and slit as shown at 32, so as to form lugs 33, which, when the strip is in place in the channel, can be pressed outwardly, as shown in Fig. 7, to take into the counterbores. This will positively retain the strip in position.

It will thus be seen that a ring is provided which, while it has a varying cross section, has a uniform width and depth. The bearing walls engaging the side walls of the grooves in the piston will, therefore, be uniform, so as to provide for a maximum bearing in the piston. The eccentric arrangement of the channel in the ring gives this ring a uniform resistance to bending, and therefore, a uniform tension on the cylinder walls. It will be noted that this uniform tension is obtained by a decrease in the section or moment of inertia from the center to the ends of the ring, leaving, however, the side bearing walls of uniform depth. The result, therefore, is that, while the tension is uniform, the bearing of the ring in the groove is also uniform. The arrangement of the bronze strip having formed thereon the joint or slot closing elements seated in the slots in the ends of the piston, forms not only a tight and efficient joint, but also has a further advantage. The bronze spring strip having a coefficient of expansion which is approximately three times that of the cast iron, expands when heated, and in expanding it forces the ring against the cylinder walls, so that there is superimposed on the cast iron ring a tension in addition to the inherent tension of the ring. This bronze strip, therefore, acts as a reinforcement, as well as a joint closing device. The arrangement of this bronze strip with its fins in the ring channel and in the slots in the ends of the ring, together with the arrangement of the cuts 11 and 12, produces a true labyrinth packing, and forming a leakproof joint. This ring, therefore, possesses all the advantages that an ideal ring should have, namely, uniformity of pressure, increasing rather than decreasing with the temperature, maximum bearing surface, and leakproof joint. The cost of this ring will not be greater than the ordinary rings, since the channeling operation can be performed just as readily as the eccentric boring operations in the ordinary ring, and since the bronze strip can be readily formed by punching operations.

It is obvious that various changes may be made in the details of construction without departing from the spirit of this invention. It is, therefore, to be understood that this invention is not to be limited to the specific construction shown and described.

Having thus described the invention what is claimed is:

1. A piston ring having uniform bearing walls and a uniform resistance to bending, and a tensioning member inside of said ring.

2. A piston ring having a uniform width and thickness and a varying cross section, and a tensioning member disposed and retained within said ring.

3. A piston ring having uniform bearing walls and channeled internally to exert a uniform tension on the cylinder wall, and a tensioning member disposed within the channel in said ring.

4. A piston packing comprising a split ring, and a tension member inside of said ring, said tensioning member having a different coefficient of expansion than said ring.

5. A piston packing comprising a split ring, and a member having a different coefficient of expansion than and extending inside of and retained by said ring, said member being adapted to tension and close the joint in said ring.

6. A piston packing comprising a split ring having a circumferential channel cut in the inside face thereof, and a joint closing member mounted in said channel.

7. A piston packing comprising a split ring having a circumferential channel cut in the inside face thereof and having its ends slotted, and a member mounted in said channel and having fins adapted to close said slots.

8. A piston packing comprising a split ring of uniform width and thickness and having a cross section which decreases from the center to the ends of the ring and a member inside of said ring adapted to close the joint therein.

In testimony whereof I affix my signature this 1st day of May, 1915.

STEPHEN D. HARTOG.